(12) United States Patent
Brookhart et al.

(10) Patent No.: US 10,620,114 B2
(45) Date of Patent: Apr. 14, 2020

(54) SYSTEMS AND METHODS TO ASSESS CORROSION RISK

(71) Applicant: Sikorsky Aircraft Corporation, Stratford, CT (US)

(72) Inventors: Andrew Brookhart, Wallingford, CT (US); Mark W. Davis, Southbury, CT (US); Mark R. Jaworowski, Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 150 days.

(21) Appl. No.: 15/575,983

(22) PCT Filed: May 18, 2016

(86) PCT No.: PCT/US2016/033021
§ 371 (c)(1),
(2) Date: Nov. 21, 2017

(87) PCT Pub. No.: WO2016/191166
PCT Pub. Date: Dec. 1, 2016

(65) Prior Publication Data
US 2018/0149579 A1 May 31, 2018

Related U.S. Application Data

(60) Provisional application No. 62/166,578, filed on May 26, 2015.

(51) Int. Cl.
*G01N 17/04* (2006.01)
*G06Q 10/00* (2012.01)
(Continued)

(52) U.S. Cl.
CPC ............. *G01N 17/04* (2013.01); *B64F 5/60* (2017.01); *G06Q 10/20* (2013.01); *B32B 2605/18* (2013.01); *G01N 21/95* (2013.01)

(58) Field of Classification Search
CPC ....... B32B 2605/18; B64F 5/60; G01N 17/04; G01N 21/95; G06Q 10/20
(Continued)

(56) References Cited

U.S. PATENT DOCUMENTS

| 8,040,243 B2 | 10/2011 | Bommer et al. |
| 8,085,165 B2 | 12/2011 | Wavering et al. |
| 8,185,326 B2 | 5/2012 | Safai et al. |

(Continued)

FOREIGN PATENT DOCUMENTS

| CN | 103693209 | 4/2014 |
| CN | 103693209 A | 4/2014 |

(Continued)

OTHER PUBLICATIONS

Demo, J., "Deployment of a Wireless Corrosion Monitoring System for Aircraft Applications", Aerospace Conference, 2013 IEEE, Mar. 2-9, 2013, Print ISBN 978-1-4673-1812-9.

(Continued)

*Primary Examiner* — John H Le
(74) *Attorney, Agent, or Firm* — Cantor Colburn LLP

(57) ABSTRACT

A method of assessing airframe corrosion risk includes determining a component corrosion stress based on data from at least one of a corrosivity sensor, an aircraft exposure history, a climate database, or an aircraft configuration. The method includes generating a component corrosion risk based on the determined component corrosion stress. An accumulated component corrosion risk is calculated based on the component corrosion risk and a historical component corrosion risk. An airframe corrosion risk is determined based on the accumulated component corrosion risk.

19 Claims, 4 Drawing Sheets

(51) Int. Cl.
*B64F 5/60* (2017.01)
*G01N 21/95* (2006.01)

(58) Field of Classification Search
USPC ...... 702/183, 3, 34, 42; 205/776.5; 324/649; 427/180
See application file for complete search history.

(56) References Cited

U.S. PATENT DOCUMENTS

| | | |
|---|---|---|
| 2004/0044483 A1 | 3/2004 | Menon et al. |
| 2007/0128351 A1* | 6/2007 | Nanna ............... C08G 18/10 427/180 |
| 2007/0198215 A1* | 8/2007 | Bonanni ............ G05B 23/0251 702/183 |
| 2007/0239407 A1 | 10/2007 | Goldfine et al. |
| 2009/0058427 A1* | 3/2009 | Materer ................ G01N 17/04 324/649 |
| 2011/0210014 A1* | 9/2011 | Garosshen ........... G01N 27/121 205/776.5 |
| 2012/0271824 A1 | 10/2012 | Goldfine et al. |
| 2014/0058594 A1* | 2/2014 | Plowman ............ G05B 23/0275 701/14 |

FOREIGN PATENT DOCUMENTS

| | | |
|---|---|---|
| EP | 1408324 A1 | 4/2004 |
| EP | 2701025 A1 | 2/2014 |
| WO | 01/080043 | 10/2001 |
| WO | WO-01/080043 A2 | 10/2001 |
| WO | 2014/018288 | 1/2014 |
| WO | 2014018288 A1 | 1/2014 |
| WO | WO-2014/018288 A1 | 1/2014 |

OTHER PUBLICATIONS

Friedersdorf, F. "Improved Asset Management Through Corrosion Health Monitoring", Corrosion Conference and Expo 2013, Orlando, FL Mar. 17-21, 2013, vol. 3, Paper No. 2178, NACE International, Product No. 51313-02178-SG, 2013.

PCT International Search Report and Written Opinion dated Aug. 25, 2016, issued during the prosecution of corresponding PCT International Patent Application No. PCT US2016/033021.

European Search Report for Application No. 16800506.4-1001; dated Feb. 15, 2019; 8 pages.

* cited by examiner

SYSTEMS AND METHODS TO ASSESS CORROSION RISK

CROSS REFERENCE TO RELATED APPLICATION

This application is a 35 U.S.C. § 371 U.S. National Stage Application of PCT International Patent Application No. PCT/US2016/033021, filed on May 18, 2016, which claims priority to and benefit of U.S. Provisional Application No. 62/166,578, filed May 26, 2015, entitled SYSTEMS AND METHODS TO ASSESS CORROSION RISK, each of which is incorporated by reference herein in its entirety.

STATEMENT REGARDING FEDERALLY SPONSORED RESEARCH OR DEVELOPMENT

This invention was made with government support under prime contract number W911W6-10-2-0006 awarded by the U.S. Army. The government has certain rights in the invention.

BACKGROUND OF THE INVENTION

1. Field of the Invention

The present disclosure relates to aircraft corrosion risk, and more particularly assessing airframe corrosion risk.

2. Description of Related Art

Corrosion affects many aircraft, for example, rotorcraft. As corrosion is an environmental-cycle based phemonena, traditional methods for managing corrosion risk using flight hours or calendar time can be inaccurate in tracking the likelihood, e.g. risk, of corrosion. Due to the inaccurate information, an abundance of caution dictates frequent inspections for corrosion, the frequency of which, in many cases, ends up being more than necessary for a given aircraft in view of the actual corrosion found upon inspection.

Such conventional methods and systems have generally been considered satisfactory for their intended purpose. However, there is still a need in the art for improved methods and systems for assessing aircraft corrosion risk. The present disclosure provides a solution for this need.

SUMMARY OF THE INVENTION

A method of assessing airframe corrosion risk includes determining a component corrosion stress based on data from at least one of a corrosivity sensor, an aircraft exposure history, a climate database, or an aircraft configuration. The method includes generating a component corrosion risk based on the determined component corrosion stress. An accumulated component corrosion risk is calculated based on the component corrosion risk and a historical component corrosion risk. An airframe corrosion risk is determined based on the accumulated component corrosion risk.

Generating the component corrosion risk can include comparing the determined component corrosion stress to a pre-determined component corrosion stress allowable. Generating the component corrosion risk can include correlating the pre-determined component corrosion stress allowable to a modeled corrosion initiation time to generate the component corrosion risk. Determining the component corrosion stress can include generating a corrosion rate for aluminum using the aircraft exposure history and an atmospheric corrosion model. The method can include correlating the corrosion rate for aluminum to a corrosion stress from a pre-determined empirical model to generate the determined component corrosion stress.

The method can include recommending a maintenance action for components within a region of an airframe based on the airframe corrosion risk, and/or for an individual component based on the component corrosion risk. The method can include recording and storing information regarding actual structural condition after the maintenance action has been performed. The recorded and stored information can be used to update the pre-determined component corrosion stress allowable. The method can include recording and storing the component corrosion risk for use in generating the historical component corrosion risk.

It is contemplated that the method can include generating the aircraft exposure history based on data collected from microclimate sensors located on an aircraft. The data collected from the microclimate sensors can include temperature, relative humidity, and/or wetness. The climate database can include chloride deposition rate, $SO_2$ pollution, temperature and/or humidity for a plurality of locations. Determining the component corrosion stress based on data from the climate database can include retrieving an aircraft location from at least one of a GPS sensor or manual input and correlating the aircraft location with one of the plurality of locations in the climate database to determine at least one of chloride deposition rate, sulfur dioxide ($SO_2$) pollution, temperature, or humidity for the aircraft location.

Determining the component corrosion stress can include comparing a wetness derived from the aircraft exposure history with a wetness derived from the climate database and the aircraft configuration to generate a synthesized wetness. Determining the component corrosion stress can include generating a corrosion rate for aluminum using the synthesized wetness and an environmental exposure equation, and correlating the corrosion rate for aluminum to a corrosion stress from a pre-determined empirical model to generate the determined component corrosion stress. Generating the component corrosion risk can include comparing the determined component corrosion stress to a pre-determined component corrosion stress allowable and correlating the pre-determined component corrosion stress allowable from pre-determined empirical data to determine component specific corrosion risk.

In another aspect, a system for assessing corrosion risk includes a plurality of sensors disposed on one or more aircraft components to assess airframe corrosion. A corrosion risk assessment module is operatively connected to the plurality of sensors to calculate a corrosion stress based on data from at least one of an aircraft exposure history, a climate database, or an aircraft configuration, to generate a component corrosion risk by comparing the determined component corrosion stress to a pre-determined component corrosion stress allowable, to calculate an accumulated component corrosion risk based on the component corrosion risk and a historical component corrosion risk, and to determine an airframe corrosion risk based on the accumulated component corrosion risk. At least one of the plurality of sensors can be a microclimate sensor that measures temperature, relative humidity, and/or wetness. At least one of the plurality of sensors can be a GPS sensor to provide aircraft location data to the corrosion risk assessment module. At least one of the plurality of sensors can be a corrosivity rate sensor and/or a cumulative corrosivity sensor to provide information to the corrosion risk assessment module.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
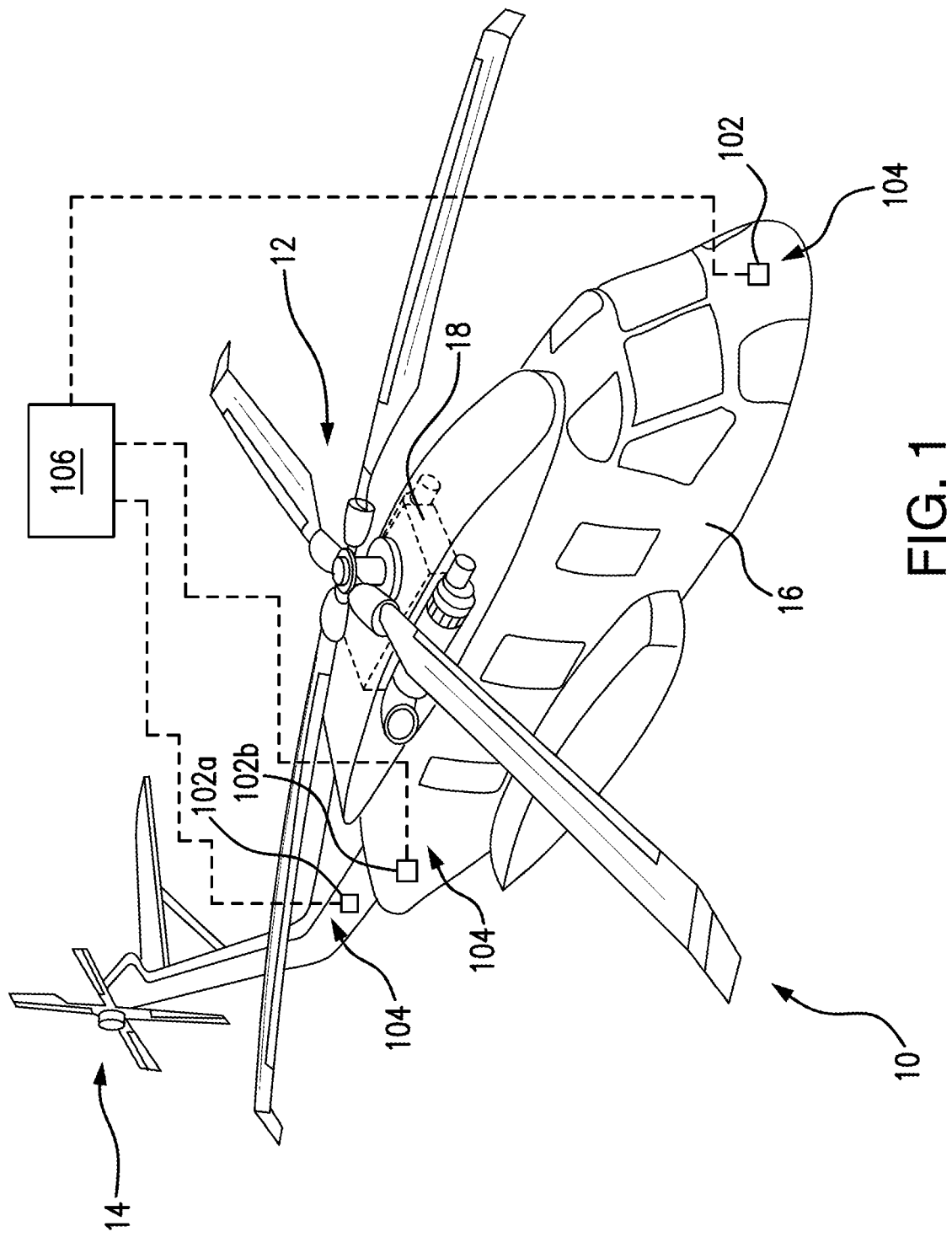
FIG. 1 is a schematic view of an exemplary embodiment of a vertical take-off and landing (VTOL) aircraft, showing a schematic view of an exemplary embodiment of a system for assessing corrosion risk constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a vertical takeoff and landing (VTOL) aircraft in accordance with the disclosure is shown in FIG. 1 and is designated generally by reference character 10. Other embodiments of VTOL aircraft in accordance with the disclosure, or aspects thereof, are provided in FIGS. 2-5, as will be described.

As shown in FIG. 1, VTOL aircraft 10 includes a main rotor system 12 and tail rotor system 14 supported by an airframe 16. Airframe 16 also includes a main rotor system 12 and tail rotor system 14. Main rotor system includes a main gearbox 18. A system 100 for assessing corrosion risk includes a plurality of sensors 102 disposed on one or more aircraft components 104 to assess airframe 16 corrosion. It is contemplated that components 104 can be disposed on or integral with airframe 16. It is also contemplated that sensors 102 can be applied external to and/or within aircraft 10.

With continued reference to FIG. 1, a corrosion risk assessment module 106 is operatively connected to the sensors 102 to assess airframe corrosion risk, as will be described in more detail below. At least one of sensors 102 is a microclimate sensor 102a that measures at least one of temperature, relative humidity, or wetness. At least one of the sensors is a OPS sensor 102b to provide aircraft location data to corrosion risk assessment module 106. Although a particular VTOL aircraft configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, and fixed-wing aircraft will also benefit from the present invention.

Those skilled in the art will readily appreciate that while corrosion risk assessment module 106 is shown external to aircraft components 104, corrosion risk assessment module 106 can be disposed within one of aircraft components 104. It is also contemplated corrosion risk assessment module 106 can be physically displaced from sensors 102, e.g. they can be in wireless communication with one another. For example, corrosion risk assessment module 106 can be on an aircraft and sensors 102 can be configured to send wireless signals to corrosion risk assessment module 106 and receive wireless signals from corrosion risk assessment module 106. In addition, it is contemplated that signals from sensors 102 to corrosion risk assessment module 106, and vice versa, can be sent through an intermediary, such as a satellite or the like.

Figure 2:
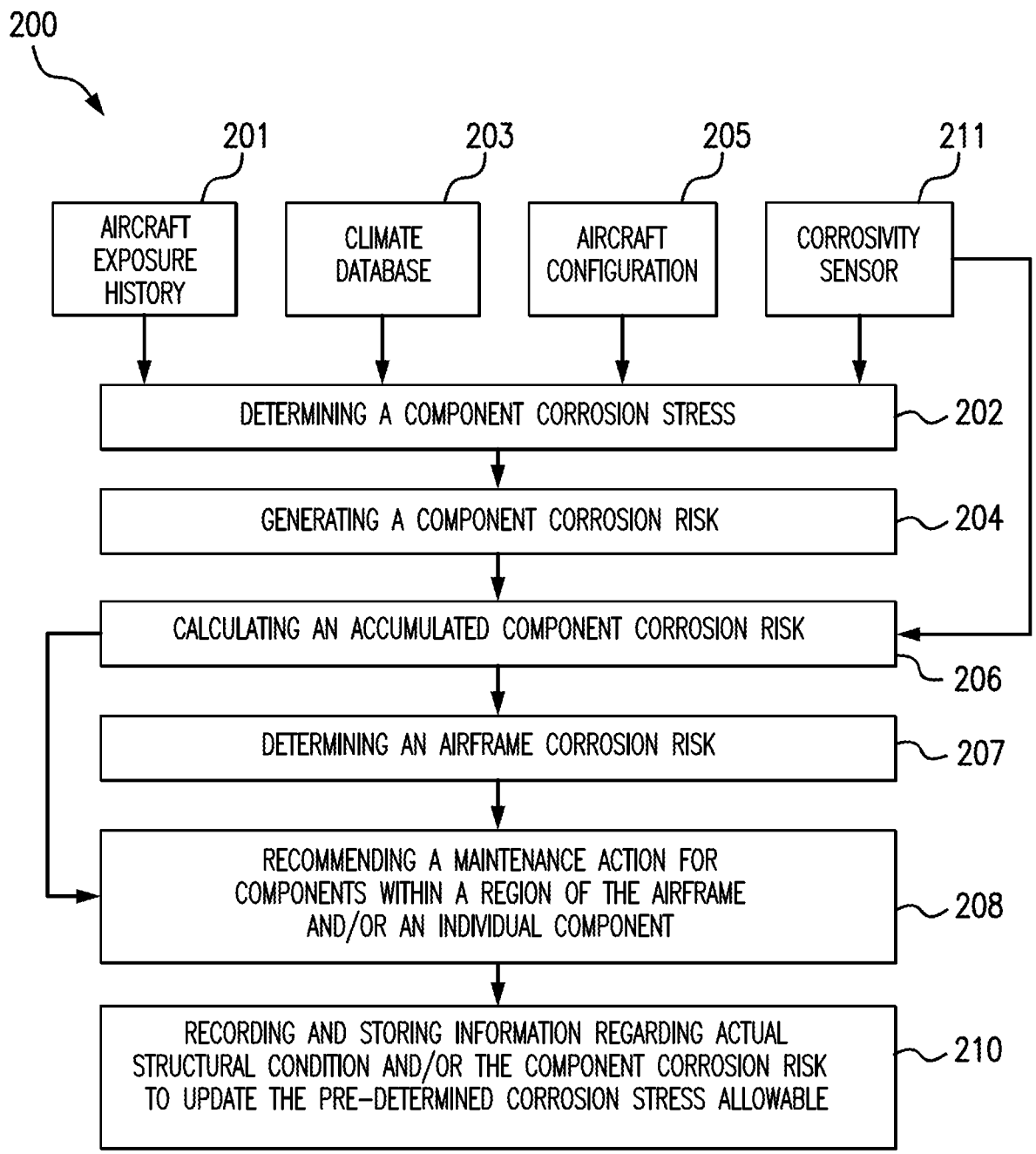
FIG. 2 is a flowchart of an exemplary method for assessing airframe corrosion risk in accordance with the invention, showing operations for determining airframe corrosion risk based on an accumulated component corrosion risk.

With reference to FIG. 2, a method 200 of assessing airframe corrosion risk includes determining a corrosion stress based on data from an aircraft exposure history 201, a climate database 203, an aircraft configuration 205, and/or a corrosivity sensor 211, as indicated by box 202. Climate database 203 includes a variety of data points taken over a given range of time and/or for a variety of locations, for example, climate database 203 includes chloride deposition rate and/or $SO_2$ pollution for a plurality of locations. Those skilled in the art will readily appreciate that climate database can include a variety of other environmental parameters, and the like. It is contemplated that the locations within climate database 203 can be categorized, for example, by distance from saltwater and climate type. Those skilled in the art will readily appreciate that climate database 203 can include information from customer or operator local weather stations, and/or the National Oceanic and Atmospheric Administration (NOAA) database. Data from aircraft configuration 205 includes information regarding coatings applied, known water and fluid collection areas, material systems, monitored compartments, sensor installation data, and the like.

With continued reference to FIG. 2, method 200 includes generating a component corrosion risk, e.g. for component 104, by comparing the determined component corrosion stress (indicated by box 202) to a pre-determined component corrosion stress allowable, as indicated by box 204. In this manner, corrosion risk can be analyzed on a component-by-component basis for those components for which corrosion stress has been specifically calculated or measured, e.g. high risk components, and/or corrosion risk across a region can be analyzed based on just a few sensors throughout the aircraft. Method 200 includes calculating an accumulated component corrosion risk based on the generated component corrosion risk (indicated by box 204) and a historical component corrosion risk, as indicated by box 206. Method 200 includes determining an airframe, e.g. airframe 16, corrosion risk based on the accumulated component corrosion risk for at least one of the components on the airframe, as indicated by box 207.

Method 200 includes recommending a maintenance action for components within a region of the airframe and/or an individual component based on the airframe corrosion risk and/or the component corrosion risk, as indicated by box 208. Method 200 includes recording and storing information regarding actual structural condition, e.g. corrosion present or not, after a maintenance action has been performed so that the recorded and stored information can be used to update the pre-determined corrosion stress allowable, as indicated by box 210. Method 200 includes recording and storing the component corrosion risk for use in generating and/or updating the historical component corrosion risk, as indicated by box 210. It is contemplated that the actual structural condition data being stored can be generalized for components across a region of the airframe, or on a component-by-component basis.

Figure 3:
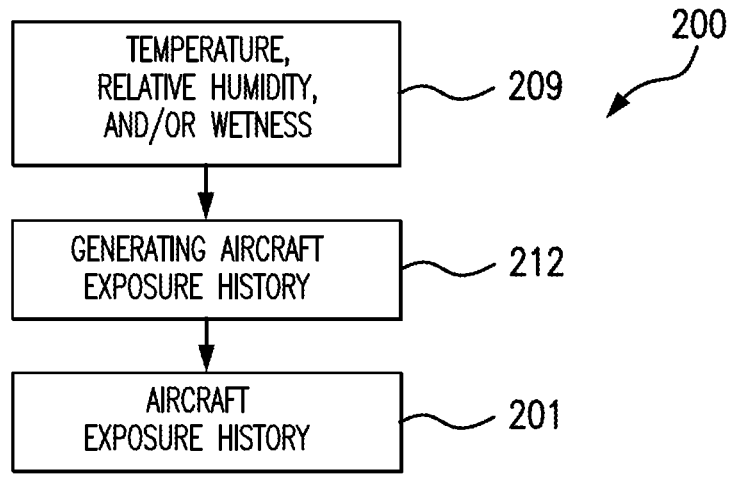
FIG. 3 is a flowchart of another aspect of assessing airframe corrosion risk in accordance with the invention, showing operations for generating aircraft exposure history.

As shown in FIG. 3, method 200 includes generating aircraft exposure history based on data 209 collected from microclimate sensors, e.g. sensors 102, located on an aircraft, as indicated schematically by box 212. Data 209 collected from the microclimate sensors includes temperature, relative humidity, and/or wetness.

Figure 4:
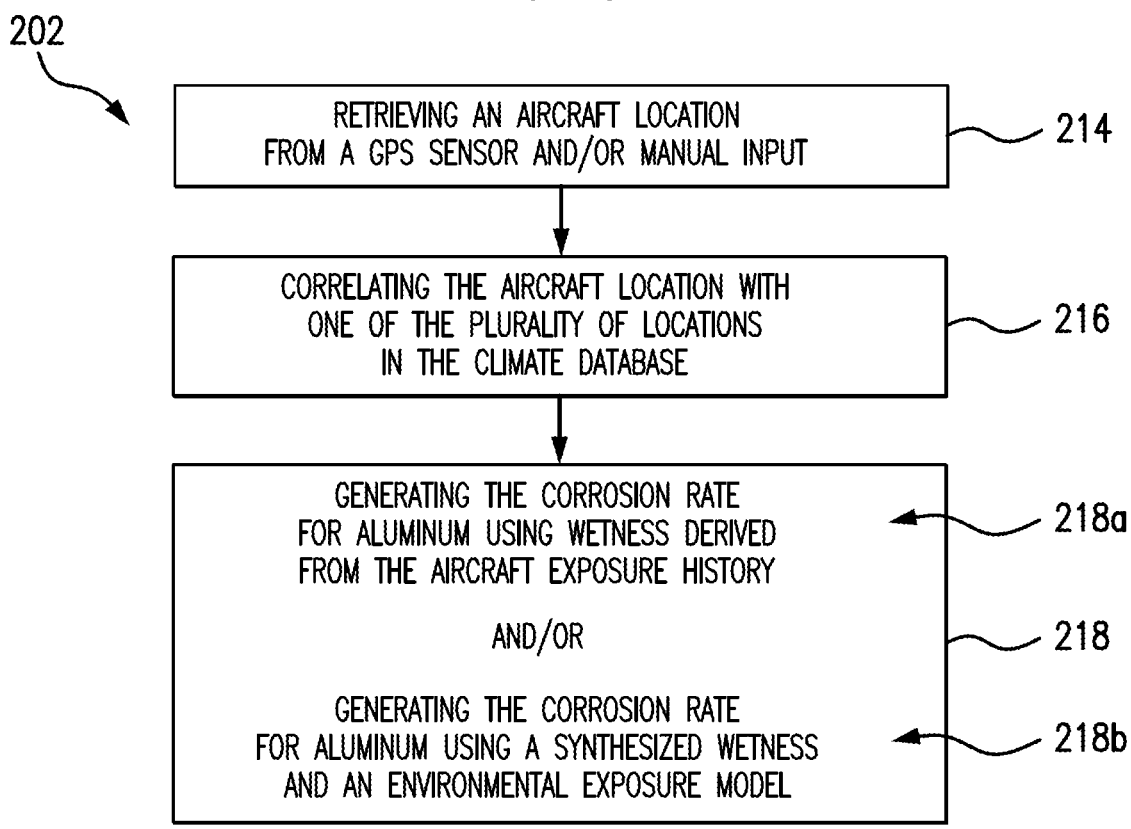
FIG. 4 is a flowchart of another aspect of assessing airframe corrosion risk in accordance with the invention, showing operations for generating a corrosion rate for aluminum.

As shown in FIG. 4, determining the corrosion stress based on data from the climate database includes retrieving an aircraft location from a UPS sensor and/or manual input, as indicated by box 214, and correlating the aircraft location with one of the plurality of locations in the climate database to determine at least one of chloride deposition rate, $SO_2$ pollution, and/or other environmental parameters for the aircraft location, as indicated by box 216. Determining the corrosion stress includes generating a corrosion rate for aluminum with a wetness derived from the aircraft exposure history, e.g. micro-climate sensors 102, the chloride deposition rate and $SO_2$ pollution for the aircraft location, and an environmental exposure model, such as an ISO CORRAG based model, as indicated by item 218a in box 218. Wetness is derived from temperature and relative humidity (RH) data collected from the micro-climate sensors, and/or the climate database, as described below. Chloride deposition rate and $SO_2$ pollution for given aircraft location are related to the distance from saltwater and the climate type, respectively. For example, distance from ocean data obtained from available map sources can be used as an input for chloride deposition rates.

With continued reference to FIG. 4, it is also contemplated that method 200 can include comparing the wetness derived from the aircraft exposure history with a wetness derived from the temperature and RH data from the climate database to generate a synthesized wetness and/or to verify the accuracy of each respective wetness, as indicated by item 218b in box 218. Those skilled in the art will readily appreciate that by comparing wetness data from the aircraft exposure history, e.g. sensors 102, with general wetness pulled from the climate database, it is possible to understand whether the aircraft has been in a hanger or sheltered, and/or whether specific sensors have been shielded from precipitation. Generating the corrosion rate for aluminum includes generating the corrosion rate for aluminum using the synthesized wetness, the chloride deposition rate and $SO_2$ pollution for the aircraft location, and an environmental exposure equation or model, such as an ISO CORRAG based model, as indicated by item 218b in box 218.

It is also contemplated that cumulative corrosivity sensors can be used in addition to or separate from the environmental exposure model approach described above. Cumulative corrosivity sensors update the cumulative risk of corrosion on their own e.g. without using an environmental exposure model approach, and can be placed on various components similarly to sensors 102. Those skilled in the art will readily appreciate that instantaneous corrosivity sensors can also be used in laboratory or field testing to identify needed corrosion/environment sensor placement locations. Instantaneous (rate) sensors will update the corrosion stress, prior to converting from stress to corrosion risk, as described below.

Figure 5:
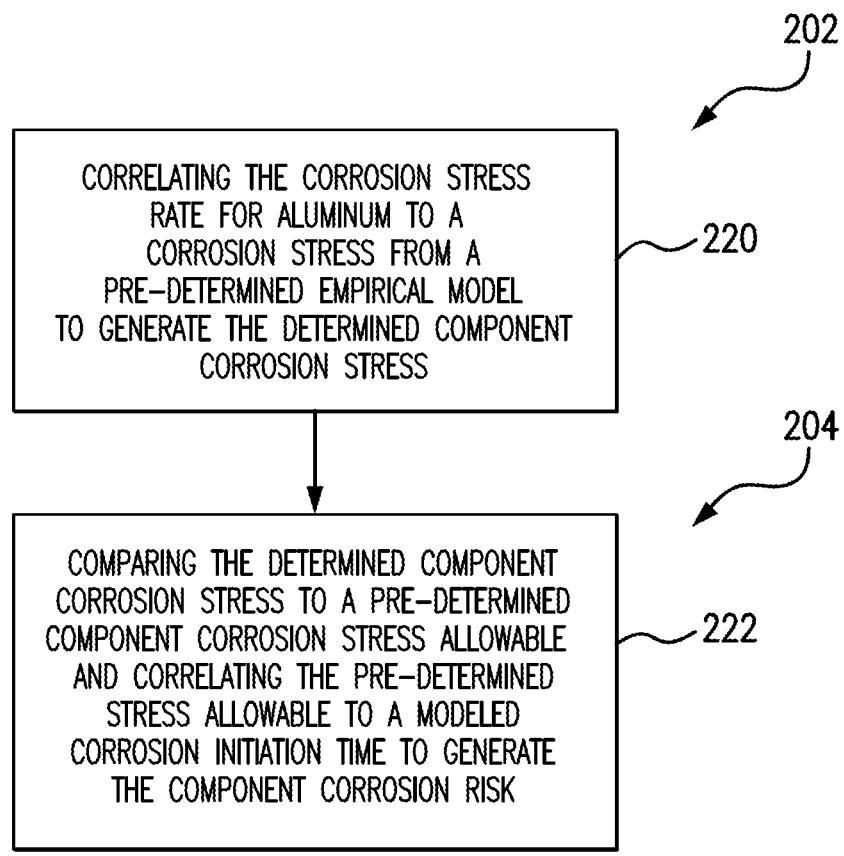
FIG. 5 is a flowchart of another aspect of assessing airframe corrosion risk in accordance with the invention, showing operations for determining the component corrosion risk.

With reference now to FIG. 5, the corrosion stress for aluminum, as calculated or as measured above, takes into account specific environmental exposure but is not specific to an airframe. Determining the component corrosion stress 202 includes correlating the corrosion rate for aluminum to a corrosion stress from pre-determined empirical model, as indicated by box 220. The corrosion stress from the pre-determined empirical model that corresponds to the corrosion rate for aluminum is the determined component corrosion stress that is used to then determine component corrosion risk.

Generating the component corrosion risk 204 includes comparing the determined component corrosion stress to a pre-determined component corrosion stress allowable, as indicated by box 222. Generating the component corrosion risk 204 includes correlating the pre-determined component stress allowable to a modeled corrosion initiation time to generate the component corrosion risk, also as indicated by box 222. The pre-determined component corrosion stress allowable and its relationship with corrosion initiation time is determined by performing laboratory testing and by using data stored regarding actual structural condition after a maintenance action, as described above.

Laboratory testing includes testing representative materials and coating systems at various aircraft locations. The testing includes placing defects in test specimens and determining the time from the beginning of testing until corrosion is detected on the test specimens (corrosion initiation time). Based on testing results, an empirical curve plotting the experimental corrosion stress and the experimentally measured corrosion initiation time is used to determine how much corrosion "damage" has occurred and a corresponding risk level. During actual use, the determined component corrosion stress, either calculated or measured as described above, is ultimately correlated to an empirical curve that was created during laboratory testing to determine how much damage has occurred. The empirical curves that were created during laboratory testing can be updated by using data stored regarding actual corrosion after a maintenance action, as described above.

Systems and methods for assessing aircraft corrosion risk combine both environmental and aircraft configuration data to provide for a more accurate assessment of corrosion risk. This permits a condition-based maintenance paradigm, where inspections are conducted based on the risk of corrosion, as opposed to just flight hours, or the like, tending to reduce maintenance costs and optimize maintenance procedures.

The methods and systems of the present disclosure, as described above and shown in the drawings, provide for systems and methods for assessing aircraft corrosion risk with superior properties including optimization of corrosion maintenance, and reduction in maintenance time and costs. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of assessing airframe corrosion risk, comprising:
   determining a component corrosion stress based on an aircraft location and data from of an aircraft exposure history and a climate database, wherein determining the component corrosion stress includes generating a corrosion rate for aluminum using the aircraft exposure history, the climate database and an atmospheric corrosion model, and correlating the corrosion rate for aluminum to a corrosion stress from a pre-determined empirical model to generate the determined component corrosion stress;

generating a component corrosion risk based on the determined component corrosion stress;

calculating an accumulated component corrosion risk based on the component corrosion risk and a historical component corrosion risk;

determining an airframe corrosion risk based on the accumulated components corrosion risk; and recommending a maintenance inspection of the airframe at a time where the airframe corrosion risk exceeds a predetermined level.

2. A method as recited in claim 1, wherein generating the component corrosion risk includes comparing the determined component corrosion stress to a pre-determined component corrosion stress allowable.

3. A method as recited in claim 1, wherein generating the component corrosion risk includes comparing the determined component corrosion stress to a pre-determined component corrosion stress allowable and correlating the pre-determined component corrosion stress allowable to a modeled corrosion initiation time to generate the component corrosion risk.

4. A method as recited in claim 1, further comprising recommending a maintenance action for components within a region of an airframe based on the airframe corrosion risk.

5. A method as recited in claim 4, further comprising recording and storing information regarding actual structural condition after the maintenance action has been performed and using the recorded and stored information to update a pre-determined component corrosion stress allowable.

6. A method as recited in claim 1, further comprising recording and storing the component corrosion risk for use in generating the historical component corrosion risk.

7. A method as recited in claim 1, further comprising recommending a maintenance action for an individual component based on the component corrosion risk.

8. A method as recited in claim 1, further comprising generating the aircraft exposure history based on data collected from microclimate sensors located on an aircraft.

9. A method as recited in claim 8, wherein the data collected from the microclimate sensors includes at least one of temperature, relative humidity, or wetness.

10. A method as recited in claim 1, wherein the climate database includes at least one of chloride deposition rate, sulfur dioxide ($SO_2$) pollution, temperature and humidity for a plurality of aircraft locations.

11. A method as recited in claim 10, further comprising retrieving an aircraft location from at least one of a GPS sensor or manual input, correlating the aircraft location with one of the plurality of locations in the climate database to determine at least one of chloride deposition rate, $SO_2$ pollution, temperature, and humidity for the aircraft location and determining the component corrosion stress from a wetness from the aircraft exposure history and the at least one of chloride deposition rate, $SO_2$ pollution, temperature, and humidity.

12. A method as recited in claim 1, wherein determining the component corrosion stress includes comparing a wetness derived from the aircraft exposure history with a wetness derived from the climate database and an aircraft configuration to generate a synthesized wetness.

13. A method as recited in claim 12, wherein determining the component corrosion stress includes generating a corrosion rate for aluminum using the synthesized wetness and an environmental exposure equation, and correlating the corrosion rate for aluminum to a corrosion stress from a pre-determined empirical model to generate the determined component corrosion stress.

14. A method as recited in claim 13, wherein generating the component corrosion risk includes comparing the determined component corrosion stress to a pre-determined component corrosion stress allowable and correlating the pre-determined component corrosion stress allowable from pre-determined empirical data to determine component specific corrosion risk.

15. A method as recited in claim 1, wherein determining the component corrosion stress includes updating the component corrosion stress with corrosion rate measurements obtained from a corrosivity rate sensor.

16. A method as recited in claim 1, wherein generating the component corrosion risk includes updating the component corrosion risk using cumulative corrosion measurements obtained from a cumulative corrosivity sensor.

17. A system for assessing corrosion risk comprising:
a plurality of sensors disposed on one or more aircraft components to determine an aircraft location; and
a corrosion risk assessment module operatively connected to the plurality of sensors to calculate a component corrosion stress based on the aircraft location and data from an aircraft exposure history and a climate database, to generate a component corrosion risk based on the component corrosion stress, to calculate an accumulated component corrosion risk based on the component corrosion risk and a historical component corrosion risk, to determine an airframe corrosion risk based on the accumulated component corrosion risk, and to recommend a maintenance inspection of the airframe at a time where the airframe corrosion risk exceeds a predetermined level, wherein determining the component corrosion stress includes generating a corrosion rate for aluminum using the aircraft exposure history, the climate database and an atmospheric corrosion model, and correlating the corrosion rate for aluminum to a corrosion stress from a pre-determined empirical model to generate the determined component corrosion stress.

18. A system as recited in claim 17, wherein at least one of the plurality of sensors is a microclimate sensor that measures at least one of temperature, relative humidity, or wetness.

19. A system as recited in claim 17, wherein at least one of the plurality of sensors is a GPS sensor to provide aircraft location data to the corrosion risk assessment module, or a corrosivity rate sensor or a cumulative corrosivity sensor to provide information to the corrosion risk assessment module.

* * * * *